Figures 1, 2:
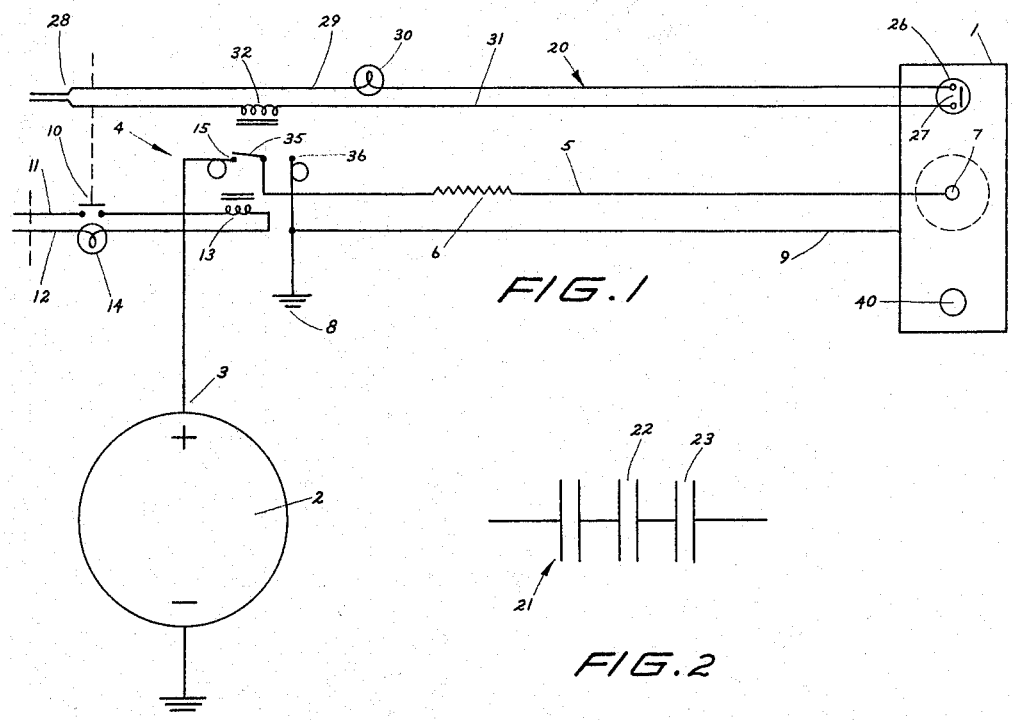

Oct. 4, 1966  T. DEUTSCHMANN  3,277,341
ENERGY STORAGE CAPACITORS AND ASSOCIATED CIRCUITRY
Filed Nov. 26, 1958

INVENTOR.
TOBE DEUTSCHMANN
BY
Ezekiel Wolf, Wolf & Greenfield
his attorney.

United States Patent Office 3,277,341
Patented Oct. 4, 1966

3,277,341
ENERGY STORAGE CAPACITORS AND
ASSOCIATED CIRCUITRY
Tobe Deutschmann, Washington St., Canton, Mass.
Filed Nov. 26, 1958, Ser. No. 776,475
10 Claims. (Cl. 317—12)

The present invention relates to fault protection and minimizing the possibility of explosions of individual capacitors used in fast discharge energy storage capacitor bank applications.

In many applications in the field of magneto-hydrodynamics, it is advantageous and necessary for a bank of capacitors to deliver energy to a load in the shortest possible time, thus passing extremely high peak currents into the load. When this is done it is essential that the individual capacitors be designed so as to contain the maximum energy storage per unit of volume. This is normally made possible by subjecting a capacitor to working stresses far above conventional stresses. Such working stresses approach the dielectric breakdown strength of the dielectric material used. Thus, when a large quantity of capacitors are connected in parallel, the importance of having a protective means becomes apparent inasmuch as a fault in an individual unit can cause adjacent units in the bank to be severely damaged. Since a bank of several thousand capacitors, each capable of peak loads of 200,000 amps, may be used, a chain reaction can be started through a fault in a single capacitor which could conceivably destroy the entire bank and the surrounding area through a series of violent explosions.

Several methods of effecting protective means have been considered, but in each instance, conventional devices such as interrupting fuses add so much inductance that the discharge of the capacitors is delayed and as a result peak currents obtained upon discharge are drastically reduced.

The present invention recognizes that energy storage capacitors are generally impregnated and filled with a nonflammable fluid which follows the basic laws of hydraulics. In the event of an internal fault in the capacitor, gas is generated through the fault of the dielectric and this gas causes an internal pressure which is transmitted by the impregnating fluid. Thus this uniform increase in pressure on the walls of the capacitor, provide a means for detecting the presence of a fault which can be suitably detected on a master control.

In the present invention, a pressure build-up internal of the capacitor is detected prior to the flow of a large amount of fault current. This early detection is necessary in order to effectively cut the faulted capacitor out of the bank before the buildup internal of the capacitor is sufficient to cause a rupture. Such an object is accomplished by utilizing capacitors having at least and preferably three sections, series arranged, so that in the event of a fault in one of the three series sections, gas pressure is built up by the arc through the fault in that particular section. Excessive fault current however is held off by virtue of the two unfaulted series sections, even though the two remaining unfaulted series sections are now operating at 50% over voltage. By virtue of these two other series sections, which while overloaded are unfaulted, case rupture is delayed at least for a limited period of time, during which the defective capacitor may be cut out of the bank. By proper design, sufficient time is allowed by virtue of the two unfaulted series sections to permit pressure buildup caused by the faulted sections to be detected by means of a pressure transducer or pressure sensitive switch incorporated into the capacitor which switch is used to relay information to a master control panel indicating a preliminary failure by visual or audible means.

Additionally the signal from the pressure transducer or switch can be fed into a relay which automatically discharges that portion of the capacitor bank which contains the faulted unit before the faulted unit has had a chance to rupture the case.

These and other objects and advantages of the present invention will be more clearly understood from a consideration of the accompanying drawings, in which:

FIGURE 1 is a schematic diagram illustrating an embodiment of the present invention, and, FIGURE 2 is a schematic diagram of a three sectioned series wound capacitor.

In FIGURE 1 there is a schematic embodiment of a preferred form of the present invention. However it is understood that the description of this embodiment is merely illustrative of the concept of the present invention.

In the arrangement there is shown a capacitor 1 which may form one of a series in a bank numbering for example, 4000 units, with each capacitor adapted to deliver for example, 200,000 amps peak load. The capacitors are designed to rapidly discharge in successive pulses in order to deliver substantial amounts of power very quickly. Each capacitor is charged from a D.C. power supply having its positive terminal 3 connected through the relay switch generally indicated at 4 to the line 5 in series with a charging resistor 6 with the end of the line 5 connected to the positive or high voltage connection 7 of the capacitor. The capacitor casing is grounded at 8 through the line 9, thus completing the power supply circuit. The charge switch 4 may be controlled by means of an auxiliary switch 10, which can be hand controlled from a central location. The switch closes a circuit through the lines 11, 12 in series with the relay coil 13 and charge lamp indicator 14. The energized coils 13 cause the switch 4 to close to the terminal 15, thus effecting a connection of the capacitor to the D.C. power supply. Charging of the capacitor is indicated by a lit lamp 14. This circuit is normally maintained while the capacitor is in proper operation. On the occasion of a fault such as in series section 21, of the three sections 21, 22 and 23 of the capacitor 1, the two remaining sections 22 and 23, will carry the overload of shorted section 21, thus preventing for a time period a short through the entire capacitor. When such a fault occurs arcing at the fault will cause the generation of gas which in turn increases pressure in the capacitor which is transmitted throughout the capacitor through the medium of the impregnating fluid within the capacitor. This gas generation causes pressure to build up within the capacitor over a period of time which varies depending upon the magnitude of the fault current. In all instances however, it is found that this time period is sufficient to permit operation of the auxiliary circuits for taking the capacitor out of operation.

A standard pressure switch indicated at 26 is suitably built into the casing with the pressure switch adapted to close the contacts indicated at 27 at a selected pressure which for example may be 20 pounds per square inch. When the terminals 27 are closed power flows from the conventional power source 28 through the series arrangement of the line 29, fault lamp indicator 30, terminals 27, line 31 and relay coil 32. Relay coil 32 is larger than relay coil 13 and therefore when energized overrides relay coil 13 causing contact blade 35 of the switch 4 to move to terminal 36. When this occurs the voltage in the three series sections 21, 22 and 23 are discharged through the line 5 to ground. The occasion of a fault is indicated by the fault indicator lamp 30. In place of a fault indicator lamp 30 other indicators or alarms may of course be used at some central master control center. A spring, not shown, may be used to close the contact blade 35 to terminal 36 in the event of failure of the power, as an added safety measure.

A pressure release valve 40 adapted to open at some selected pressure, as for example 40 pounds per square inch, is also incorporated into the casing so as to prevent case rupture in the event that a faulted capacitor is not removed due to malfunction of the electrically operated pressure switch.

Various types of capacitors may be used. However, they should have at least three series connected sections. Normally, the capacitors are designed for high capacitance and high working stress with the capacitors capable of storing energy in a range for example of 1000 to 4000 joules. The specific capacitance of the capacitor may vary depending upon the specific purpose for which it is designed.

The mechanical or pressure release valve 40 is necessary as it is possible that the electrically operated pressure switch circuit may not function properly due for example to non operating relay switch, etc. Thus, by utilizing a combination of two different release systems, a full safe operation may be obtained, since the two systems are independent of one another.

Reliance cannot be made, however, solely upon the pressure release valve for several reasons, first, if pressure release valves alone were used, the relief of pressure through the valve installed in a capacitor would, upon its failure cause the impregnating fluid to spill out of the casing onto the surrounding area, thus causing a substantial nuisance and mess. Secondly, utilization of an electrical system provides a means by which a faulted capacitor or group of capacitors containing a faulted capacitor may be automatically disconnected from the capacitor bank and an audio or visual signal may be initiated at some remote station so that an operator my remove the faulted sections promptly.

Since the individual capacitors may be arranged in a group comprising a rack, and the racks are arranged in groups comprising stacks, and are interconnected by means of switching greater utility in operation and control is obtained by using the electrical system therein described for automatic discharge, rather than reliance upon the mechanical system incorporating simple pressure release valves. Thus, for example, where there is provided a rack of eight capacitors, with ten successive racks forming a stack, the failure of one capacitor will cause the discharge of the capacitors in the rack in which that one capacitor is located. This facilitates the removal of the defective capacitor, for the other capacitors being deenergized need no special treatment. Furthermore, where mechanical pressure valves are used and a capacitor fails, the other unfaulted capacitors may continue to deliver energy into the faulted unit until removed which does not occur with the electrical system contemplated.

Since the failure of a unit requires its removal, the other units in the rack must be deenergized in order to permit this removal. Under the system herein contemplated, simple means are provided which permit discharge of and power cutoff to all the capacitors in the defective rack.

Having now described my invention, I claim:

1. In a bank of energy storage capacitors each having individual power supply connections, low inductance means for operatively disengaging a capacitor from said bank on the occurrence of an internal fault comprising means individually connected to each capacitor responsive to pressure increases within the capacitor to which it is connected, and means having low inductance responsive to said last mentioned means for operatively disengaging said power supply and for simultaneously grounding the faulted capacitor.

2. Circuitry responsive to pressure change in a capacitor, to disconnect from a power supply, ground and thereby discharge said capacitor, comprising said capacitor having positive and ground electrical terminals, a power supply having a positive electrical terminal, low inductance switch means for selectively electrically connecting positive terminal of said capacitor to said power supply positive terminal or to ground, circuit means having a control switch and relay coil with said relay coil adapted to be energized when said control switch is closed, said relay coil adapted on energization to actuate said switch means to connect said positive terminals, a second circuit means having a pressure sensitive switch and second relay coil adapted to be energized when said pressure sensitive switch is actuated, said pressure sensitive switch positioned in association with said device and actuated in response to a pressure change in said device, and said second relay coil adapted on energization to actuate said switch means to connect said capacitor to ground and simultaneously disconnect said positive terminals.

3. A device as set forth in claim 2 wherein said second relay coil is adapted to exert a greater force on said switch means than said first mentioned relay coil.

4. In combination a multisection series connected energy storage capacitor having a common casing within which a fault occurring in one section may generate gaseous pressure therein, a power supply, a circuit electrically coupling said power supply and capacitor for charging said capacitor, means adapted to electrically disconnect said power supply, low inductance means adapted to short and thereby ground said capacitor, and a pressure sensitive switch responsive to said gaseous pressure increases in said capacitor to simultaneously activate both of said means.

5. A device as set forth in claim 4 wherein said capacitor has a pressure relief valve adapted to open at a pressure in excess of the pressure required to actuate said pressure sensitive switch.

6. Circuitry responsive to pressure change in a capacitor, to disconnect from a power supply, ground and thereby discharge said capacitor, comprising said capacitor having positive and ground electrical terminals, a power supply having a positive electrical terminal, switch means for selectively electrically connecting said positive terminals of said capacitor to said power supply positive terminal or to ground, circuit means having in dependent operative relationship, a pressure sensitive switch and a relay coil adapted to be energized when said pressure sensitive switch is actuated, said pressure sensitive switch positioned in association with said capacitor and actuated in response to a pressure change in said capacitor, and said relay coil adapted on energization to actuate said switch means to disconnect said capacitor and power supply and to connect said capacitor to ground.

7. A fault monitoring system for high energy storage capacitors comprising a first circuit including a multisection energy storage capacitor having one terminal thereof connected to ground and the other terminal thereof connected to a selectively positionable switch member connectable to a high voltage direct current supply or to ground, a charging control circuit for effecting the selected connection of said switch member to said high voltage direct current supply during capacitor charging operations, and a second control circuit including a pressure sensitive switch actuable in response to a predetermined pressure rise within said capacitor casing, and switch control means for effecting the selective overriding connection of said switch member to ground in response to actuation of said pressure sensitive switch.

8. The system as set forth in claim 7, including a warning means disposed in said second control circuit and energized by actuation of said pressure sensitive switch.

9. The system as set forth in claim 7, including means normally biasing said selectively positionable switch member in contact with ground.

10. Fault monitoring circuitry for high energy storage capacitors comprising a first circuit including an encased energy storage capacitor having one terminal thereof connected to ground and the other terminal thereof connected, through a charging resistor, to switching means selectively connectable to a high voltage direct current supply or to ground, said switching means being normally biased in contact with ground and displaceable, for capacitor charging operations into contact with said high voltage direct current supply, and a second circuit including a pressure sensitive switch actuatable in response to a predetermined pressure rise within said capacitor casing, and switch control means for effecting the selective overriding connection of said switch means to ground in response to actuation of said pressure sensitive switch.

References Cited by the Examiner

UNITED STATES PATENTS

| | | | |
|---|---|---|---|
| 2,169,857 | 8/1930 | Treanor | 317—14 X |
| 2,418,017 | 3/1947 | Ellicock | 317—9 |
| 2,553,291 | 5/1951 | Barr | 317—15 X |
| 2,773,146 | 12/1956 | Sauer | 317—14.6 |
| 2,794,154 | 5/1957 | Minder | 317—12 |

MILTON O. HIRSHFIELD, *Primary Examiner.*

SAMUEL BERNSTEIN, *Examiner.*

R. O. FRANKLIN, J. J. HUDSON, D. B. STEEN, R. V. LUPO, *Assistant Examiners.*